Aug. 26, 1924.

J. V. TAYLOR

SHOCK ABSORBER

Filed April 21, 1923

WITNESSES
Louis Goodman
E. N. Lovewell

INVENTOR
J. V. Taylor
BY

Patented Aug. 26, 1924.

1,506,690

UNITED STATES PATENT OFFICE.

JOHN VANDIVER TAYLOR, OF SHONGALOO, LOUISIANA.

SHOCK ABSORBER.

Application filed April 21, 1923. Serial No. 633,664.

*To all whom it may concern:*

Be it known that I, JOHN VANDIVER TAYLOR, a citizen of the United States, residing at Shongaloo, Webster Parish, and State of Louisiana, have invented new and useful Improvements in Shock Absorbers, of which the following is a specification.

This invention relates to shock absorbers which are adapted to be applied to automobiles to absorb the shocks which are transmitted from the chassis due to the vibration in passing over rough places.

The invention has among its objects, the provision of a simple and practical shock absorber which may be installed upon various types of automobiles, and which will not only lessen the shocks which are transmitted to the vehicle body but will also prevent breakage of the leaf springs. The invention is adapted to be substituted for the usual shackle which connects the leaf spring to the bracket or other point of suspension, and is provided also with novel means for preventing wear upon the parts to which it is connected, thus insuring a durable and efficient medium for supplementing the action of the usual springs.

The invention will be best understood from a consideration of the following detailed description taken in connection with the accompanying drawing, which shows the invention in its preferred form, as well as the different ways of applying the same.

In the drawing:—

Figure 1:
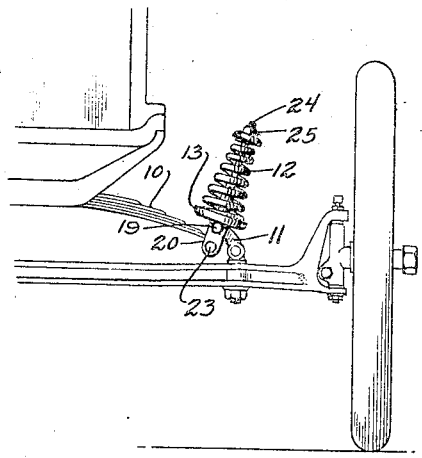
Fig. 1 is a fragmentary view of the front end of an automobile having the invention installed thereon.
Figure 2:
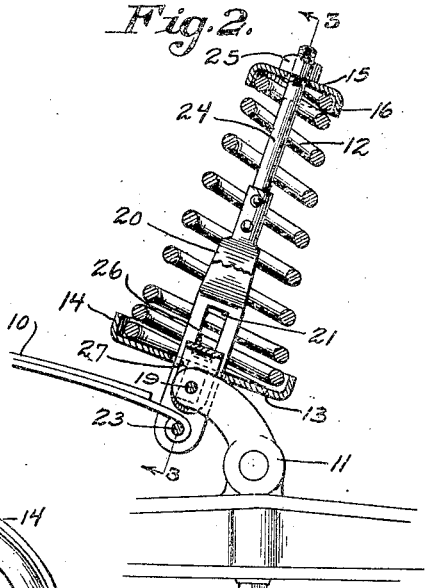
Fig. 2 is a central longitudinal section through the invention.
Figure 3:
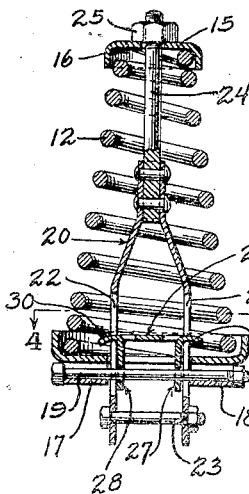
Fig. 3 is a section taken on the line 3—3 of Fig. 2.
Figure 4:
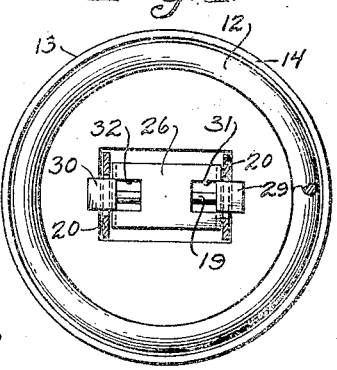
Fig. 4 is an enlarged horizontal section on the line 4—4 of Fig. 3.
Figure 5:
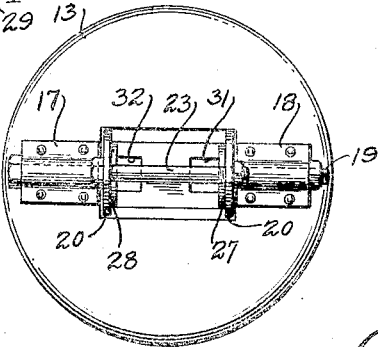
Fig. 5 is a bottom plan view of the invention.

As shown in Fig. 1, the shackle which ordinarily connects the leaf spring 10 to the bracket 11 is replaced by the shock absorber or suspension device which constitutes the present invention. This device comprises a tapered coil spring 12, which, at its larger end is seated in a circular seat 13 having a peripheral flange 14 surrounding and retaining the end of the spring. The opposite or smaller end of the spring is seated in a correspondingly smaller circular seat 15 having a similar peripheral flange 16.

The circular spring seat 13 has secured to its obverse face a pair of ears 17 and 18, which receive an attaching bolt 19. The bolt 19 may be inserted through the bolt hole in the end of the bracket 11 or through any other member from which the body supporting leaf spring is to be suspended.

A yoke 20, having slots 21 and 22 in its respective arms through which the bolt 19 passes, is provided at the extremities of its arms with an attaching bolt 23 that is passed through the loop in the end of the spring 10. The yoke has secured to its other end a stem 24 which passes through the smaller spring seat 15 and is provided with a nut 25, whereby the adjustment of the nut adjusts the tension of the spring 12.

As the automobile passes over uneven places in the road and the chassis is caused to vibrate, the yoke 20 moves up and down, the bolt 19 riding in the slots 21 and 22, whereby the attaching bolt 23, which carries the vehicle body through the medium of the spring 10, moves up and down with respect to the chassis, while the tension of the spring 12 absorbs the shocks and prevents their transmission to the vehicle body. A stop member 26 is provided with depending arms 27 and 28, which are interposed between the bracket 11 and the arms of the yoke 20, constituting wear plates, and is provided with outwardly-turned ears 29 and 30, extending into the slots 21 and 22 and constituting stops which engage the inner ends of the slots 21 and 22 to limit the compression of the spring 12 and the downward movement of the extremity of the leaf spring 10. The stop member 26 may be conveniently made from a piece of strap iron by turning down the ends to form the arms 27 and 28, while the ears 29 and 30 are punched out of the connecting web, as shown at 31 and 32.

Figure 6:
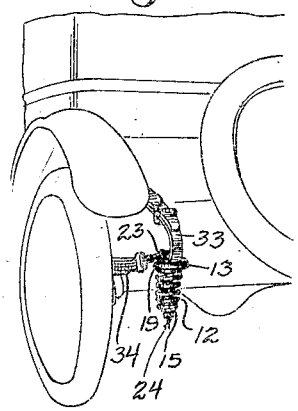
Fig. 6 is a fragmentary perspective view of the rear end of another type of automobile having the invention applied thereto.

In Fig. 6, the invention is shown as applied to the rear end of an automobile having a scroll elliptic spring. In this case, the attaching bolt 19 passes through the scroll in the end of the spring 33, while the attaching bolt 23 passes through the loop in the end of the leaf spring 34, the shock absorber being in this case inverted in position.

From the foregoing description, it will be apparent that the invention may be readily applied to various types of automobiles, and when applied as described herein, the action of the spring 12 is to supplement the action of the leaf springs, permitting the latter to have a relative movement which will result in transmitting a smaller proportion of the vibration to the body of the vehicle, as well as preventing the excessive strain upon the leaf springs which often results in breaking them. The interposition of the wear plates 27 and 28 between the relatively-movable yoke 20 and the bracket or other member upon which the device is supported prevents wear on the latter and prolongs the life and usefulness of the shock absorber. By means of the nut 25, the tension of the spring 12 may be adjusted in order to secure the best results for the particular conditions under which the automobile is operated, and the stops 29 and 30 provide means for limiting the downward movement of the leaf springs 10 or 33 to a sufficient extent to prevent the vehicle body from coming in contact with the chassis.

While I have shown and described the specific details of one form in which the invention may be embodied, it will be apparent that various modifications may be made therein within the scope of the invention as defined by the claims. It will be also understood that the invention may be applied in other relations, depending upon the particular structure of the vehicle with which it is used.

What is claimed is:—

1. In a shock absorber, the combination with a coil spring, of a circular seat for one end of the spring having ears on its obverse face, an attaching bolt secured in said ears and adapted to connect the device to a bracket or other support, a similar seat for the other end of the spring, a yoke having a stem secured to the second-mentioned seat, and arms extending through the first-mentioned seat, said arms having longitudinal slots through which said attaching bolt passes, a second attaching bolt passing through the ends of the arms, and a stop member secured to the first-mentioned attaching bolt to limit the movement of the yoke and the consequent compression of the spring, and also serving to separate the arms of the yoke from the bracket.

2. In a shock absorber, the combination with a coil spring, of a circular seat having a peripheral flange for receiving one end of the spring and having ears on its obverse face receiving an attaching bolt adapted to secure the device to a bracket or other support, a similar seat for the opposite end of the spring, a yoke secured to the second-mentioned seat with its arms extending through the first-mentioned seat and having longitudinal slots receiving said attaching bolt, a second attaching bolt passing through the ends of the arms, and a stop member having legs interposed between the arms of the yoke and the member to which the device is secured, and having ears projecting into said slots in the yoke arms and engageable with the inner ends of the slots to limit the movement of the yoke for compressing the spring.

3. In a shock absorber, the combination with a tapered coil spring, of a circular seat for the larger end of the spring having a peripheral flange and having ears on its obverse side through which pass an attaching bolt adapted to secure the device to a bracket or other support, a smaller circular seat for the other end of the spring, a yoke having arms extending through the larger spring seat and having a stem extending through the smaller spring seat, means connected with the stem for adjusting the tension of the spring, said yoke arms having longitudinal slots through which said attaching bolt passes, a second attaching bolt passing through the ends of the yoke arms, and a stop member having legs interposed between the arms of the yoke and the member by which the device is supported, and having ears projecting into the slots in the yoke arms and engageable with the inner ends of the slots to limit the movement of the yoke and the compression of the spring.

In testimony, that I claim the foregoing as my own, I have hereto affixed my signature.

JOHN VANDIVER TAYLOR.